(12) United States Patent
Kloucek et al.

(10) Patent No.: US 7,506,735 B2
(45) Date of Patent: Mar. 24, 2009

(54) VIBRATION DAMPING AND HEAT TRANSFER USING MATERIAL PHASE CHANGES

(75) Inventors: Petr Kloucek, Houston, TX (US); Daniel R. Reynolds, Oakland, CA (US)

(73) Assignee: William Marsh Rice University, Houston, TX (US)

( * ) Notice: Subject to any disclaimer, the term of this patent is extended or adjusted under 35 U.S.C. 154(b) by 0 days.

(21) Appl. No.: 10/866,973

(22) Filed: Jun. 14, 2004

(65) Prior Publication Data

US 2009/0050428 A1    Feb. 26, 2009

(51) Int. Cl.
    *F16F 7/10*    (2006.01)
(52) U.S. Cl. .................... 188/378; 188/266.1; 188/274; 188/268
(58) Field of Classification Search ........... 188/274, 188/378, 266.1, 268, 276
    See application file for complete search history.

(56) References Cited

U.S. PATENT DOCUMENTS

| 5,005,678 | A | * | 4/1991 | Julien et al. ............ 188/378 |
| 5,398,916 | A | | 3/1995 | Kramer et al. |
| 5,808,837 | A | * | 9/1998 | Norton ................ 360/254.3 |
| 6,290,037 | B1 | | 9/2001 | Williams et al. |
| 2003/0194320 | A1 | * | 10/2003 | Villhard ................ 416/96 A |
| 2004/0252005 | A1 | * | 12/2004 | Villhard et al. .......... 337/393 |

OTHER PUBLICATIONS

Kloucek, Petr, et al., "*Computational Modeling of Vibration Damping in SMA Wires*", Continuum Mechanics and Thermodynamics Manuscript No. Version 3.2, May 16, 2003, pp. 1-21.
Kloucek, Petr, et al., "*Thermal Stabilization of Shape Memory Alloy Wires*", The International Society for Optical Engineering, Mar. 3-6, 2003, vol. 5049, pp. 23-34.
Kloucek, Petr, et al., "*Thermal Stabilization of Shape Memory Alloy Wires*", SPIE Smart Structures and Materials, Mar. 3, 2003, vol. 5049, PowerPoint Presentation.

* cited by examiner

*Primary Examiner*—Bradley T King
(74) *Attorney, Agent, or Firm*—Conley Rose, P.C.; Rodney B. Carroll

(57) ABSTRACT

A method and apparatus wherein phase changes in a material can dampen vibrational energy, dampen noise and facilitate heat transfer. One embodiment includes a method for damping vibrational energy in a body. The method comprises attaching a material to the body, wherein the material comprises a substrate, a shape memory alloy layer, and a plurality of temperature change elements. The method further comprises sensing vibrations in the body. In addition, the method comprises indicating to at least a portion of the temperature change elements to provide a temperature change in the shape memory alloy layer, wherein the temperature change is sufficient to provide a phase change in at least a portion of the shape memory alloy layer, and further wherein the phase change consumes a sufficient amount of kinetic energy to dampen at least a portion of the vibrational energy in the body. In other embodiments, the shape memory alloy layer is a thin film. Additional embodiments include a sensor connected to the material.

15 Claims, 5 Drawing Sheets

VIBRATION DAMPING AND HEAT TRANSFER USING MATERIAL PHASE CHANGES

STATEMENT REGARDING FEDERALLY SPONSORED RESEARCH OR DEVELOPMENT

This work was supported by grant NSF DMS-0107539, by contract number 03891-99-23 of the Department of Energy, and by grant SECTP-NAG5-8136 by NASA.

CROSS-REFERENCE TO RELATED APPLICATIONS

Not applicable.

BACKGROUND OF THE INVENTION

1. Field of the Invention

This invention relates to the field of phase changes in materials and more specifically to using phase changes in shape memory alloys and magnetorestrictive materials to dampen vibrations, cancel noise and increase heat transfer rates.

2. Background of the Invention

With the growing sophistication of technology, there have been increasing needs to protect and enhance that technology. Such needs include damping vibrations and increasing the heat transfer rate in a wide number of applications. Vibrational energy is typically a problem because of the noise and stress involved that can cause reduced performance, damage, energy loss, and the like in applications.

Conventional techniques for passive vibration damping include the use of visco-elastic materials. However, a drawback to using viscoelastic materials is their inherently poor ability to adapt to a variance in the system or application.

Consequently, there is a need for an active, i.e., more efficient and versatile, way to dampen vibrational energy. Additional needs include increasing the heat transfer rate of materials, and dynamically enlarging the available surface area without reducing the available space for the application.

BRIEF SUMMARY OF SOME OF THE PREFERRED EMBODIMENTS

These and other needs in the art are addressed in one embodiment by a method for damping vibrational energy in a body. The method includes attaching a material to the body, wherein the material comprises a substrate, a shape memory alloy layer, and a plurality of temperature change elements. The method further comprises sensing vibrations in the body. In addition, the method comprises indicating to at least a portion of the temperature change elements to provide a temperature change in the shape memory alloy layer, wherein the temperature change is sufficient to provide a phase change in at least a portion of the shape memory alloy layer, and further wherein the phase change consumes a sufficient amount of kinetic energy to dampen at least a portion of the vibrational energy in the body.

An additional embodiment includes a heat transfer apparatus. The heat transfer apparatus comprises a first surface with a heat transfer rate. In addition, the heat transfer apparatus comprises a second surface comprising a shape memory alloy (preferably a shape memory alloy thin film), wherein the second surface covers at least a portion of the first surface. The heat transfer apparatus includes a phase change from an austenite phase to a martensite phase in the second surface, which increases the surface area of the second surface and the overall heat transfer rate.

Further embodiments include a method for increasing the surface area of a body. The method comprises securing to at least a portion of the body a shape memory alloy material. Upon exposure of at least a portion of the shape memory alloy to an amount of cooling, a phase change from an austenite phase to a martensite phase is induced in the shape memory alloy, wherein the phase change increases the surface area of the body.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Phase changing materials can be used to dampen vibrational energy, increase surface area, cancel or reduce noise, and/or increase heat transfer in an attached body. For instance, unevenly distributed internal oscillations of an atomic lattice caused by phase changes in materials can spread through parts of the body. Such phase changes can be caused by localized heating and cooling of shape memory alloys. Cooling of shape memory alloys can also increase the surface area of the alloys and/or increase heat transfer from the body. Shape memory alloys have metallurgic properties that include the shape memory effect and temperature field dependent atomic lattice transformations, which are commonly interpreted as phase changes. Temperature dependent phases of shape memory alloys include a number of martensite phases and an austenite phase. The austenite phase is typically strong, hard and rotationally symmetric, whereas the martensite phases are soft, deformable and less symmetric than the austenite phase. A shape memory alloy can exhibit either or both of the austenite and martensite phases at once.

Figure 1:
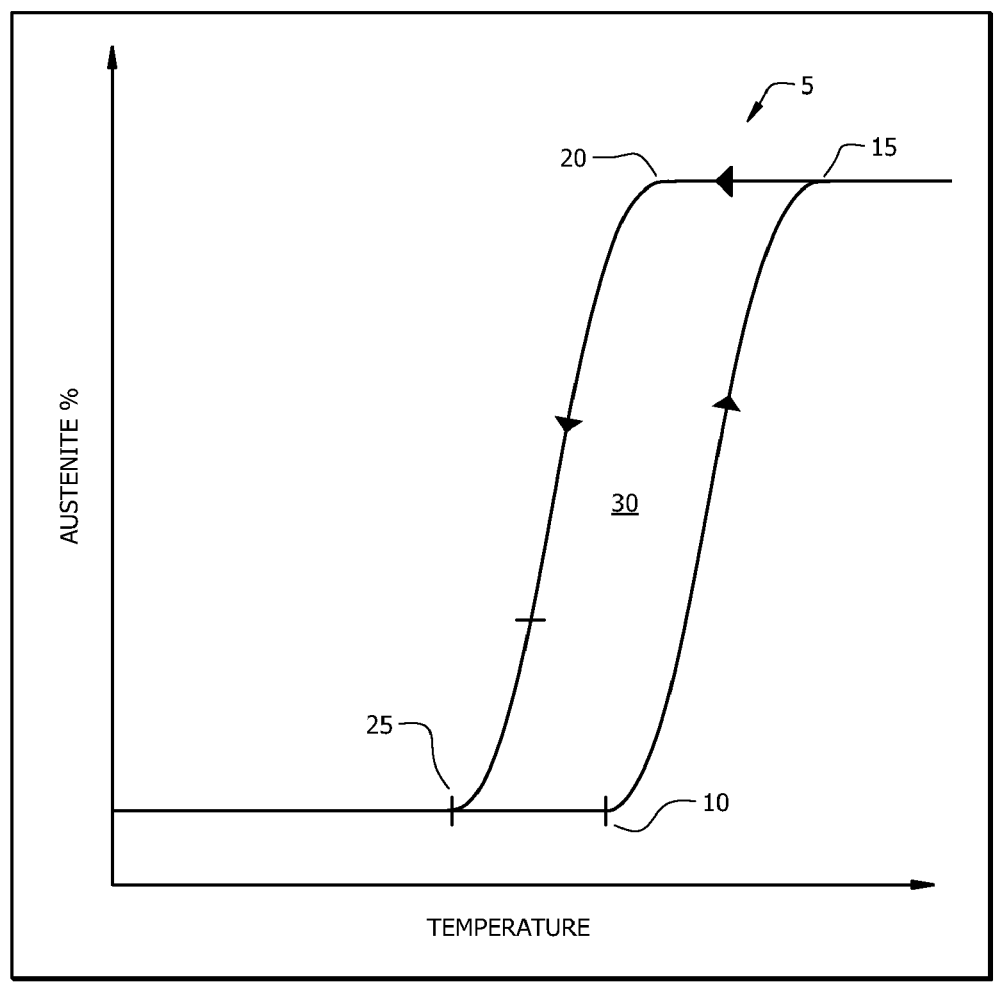
FIG. 1 illustrates a hysteresis loop for a shape memory alloy.

FIG. 1 illustrates a theoretical hysteresis loop 5. When the less symmetric phase martensite is heated, it can begin to structurally change into the austenite phase at the austenite start temperature 10. The phase change to austenite can be completed at the austenite finish temperature 15. When the austenite phase is cooled, it can begin to change to the martensite phase at the martensite start temperature 20. It can complete its phase change to martensite at the martensite finish temperature 25. It is to be understood that none of the temperatures 10, 15, 20, and 25 are the same. The hysteresis 30 is demonstrated by the area between these transformation curves. The hysteresis 30 provides a measure of the energy absorbed or released by the material during the overall transformation.

Figure 2:
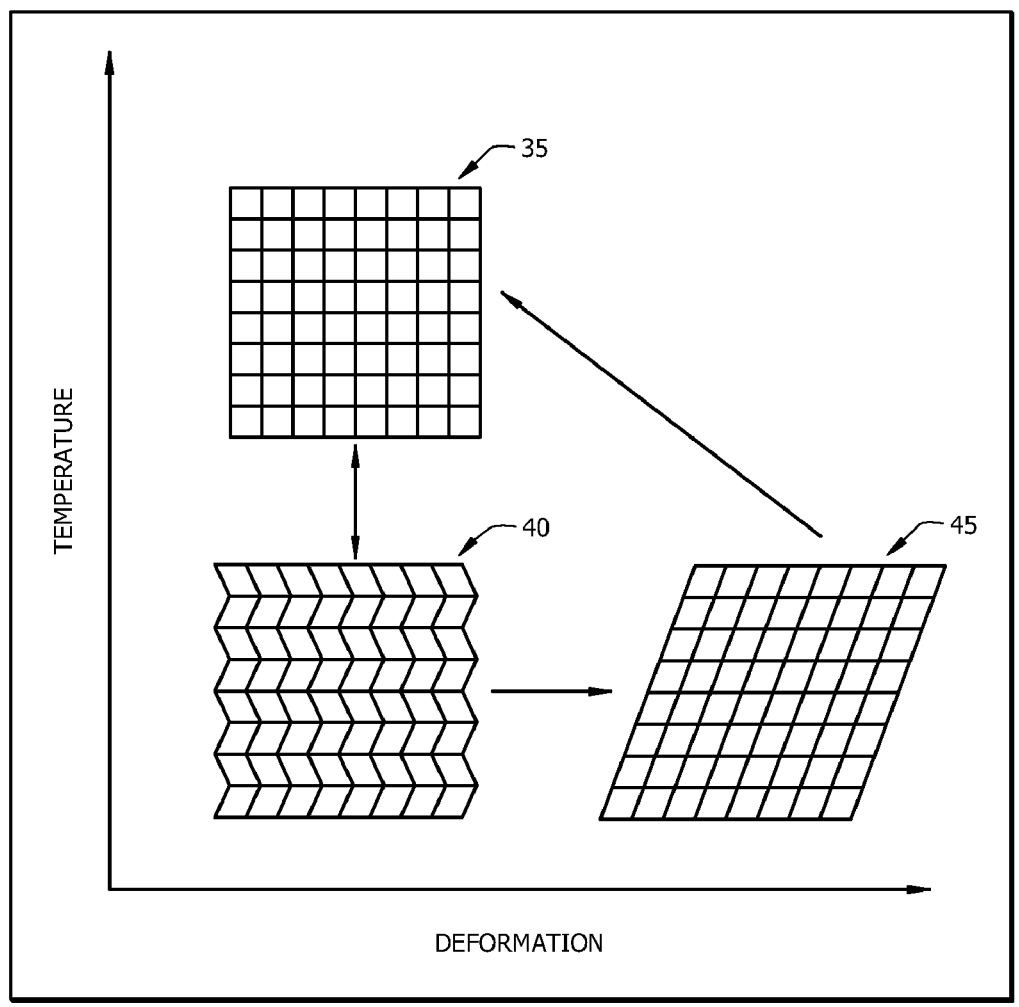
FIG. 2 illustrates a shape memory effect for a shape memory alloy.

FIG. 2 illustrates a theoretical shape memory effect between phases. Without limiting the present invention, it is believed that the behavior of shape memory alloys is based on the temperature dependent atomic-scale phase transformation. This transformation can be a result of the material's microstructure changing to minimize the strain energy at a given temperature. For instance, in the austenite phase 35, the microstructure can maintain a single crystallographic orientation. Upon cooling of the shape memory alloy, it can change into the martensite phase 40, which involves the creation of martensitic variants that have a plurality of crystallographically equivalent habit planes. It is believed that such variants are created by a mechanism referred to as twinning, in which the atoms across a twinning plane achieve displacement with mirror symmetry. In the martensite phase 40, the shape memory alloy is capable of another transformation to the deformed martensite 45. At this state, the full atomic lattice can be comprised of a single crystal variant, i.e., the twinning does not occur. Martensite may be deformed to strains of up to 8% without any effects of plasticity. When the shape memory alloy is in its martensite phase 40 or deformed martensite phase 45, its microstructure returns to its prior austenite phase 35 upon reheating to austenite finish temperature 15, wherein the shape memory alloy can resume its original shape and rigidity.

It has been discovered that thermally activated controls for triggering contraction and elongation in shape memory alloys can be used to dampen vibrational energy, increase surface area, cancel or reduce noise, and increase the heat transfer rate of materials. Thermal control includes the formation of localized and distributed transformation regions throughout the shape memory alloy. When the shape memory alloy is attached to a body, vibrations in that body can be dampened by the phase transformations in the shape memory alloy.

Figure 3:
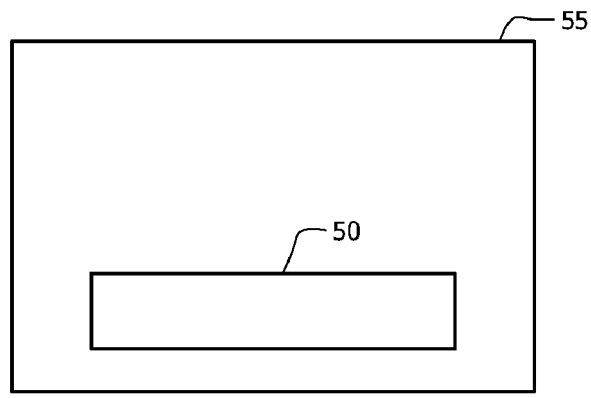
FIG. 3 illustrates a sound damping material secured to a body.

FIG. 3 illustrates a damping material 50 attached to a desired material body 55. The damping material 50 comprises a shape memory alloy thin film material having controlled formation of localized and spaced non-planar transformation regions. Damping material 50 can be attached to the desired material body 55 in any suitable way. For example, damping material 50 can be attached by glue, welds, screws, and the like. The glue can be any suitable glue for a desired application. Examples of suitable glue include ethyl cyanoacrylate and methalcrylate resin. The damping material 50 can be attached to any suitable location on body 55. In some embodiments, the location of damping material 50 on body 55 is based on frequency distribution through body 55. In such embodiments, the placement of damping material 50 can be positioned at locations that extract vibrational energy from the environment, preferably positioned at locations that extract the largest amounts of vibrational energy from the environment. Body 55 can comprise any material. For instance, body 55 can comprise metal, plastic, and the like.

Figure 4:
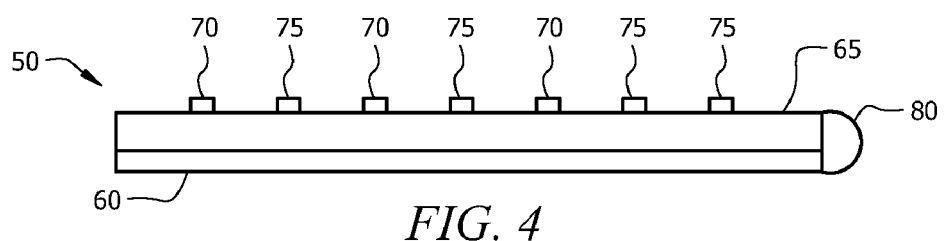
FIG. 4 illustrates a side view of the sound damping material of FIG. 3.
Figure 5:
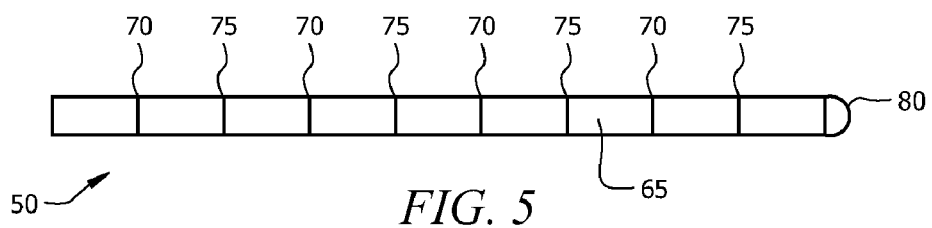
FIG. 5 illustrates a top view of the sound damping material of FIG. 3.

FIG. 4 illustrates a side view of damping material 50, and FIG. 5 illustrates a top view of damping material 50. Damping material 50 comprises a substrate 60, a shape memory alloy layer 65, a heating element 70, and a cooling element 75. Substrate 60 can be any material suitable for being secured to body 55 and supporting shape memory alloy layer 65. Examples of suitable materials for substrate 60 include kevlar, polymers, fibers from carbon nanotubes, and the like. Shape memory alloy layer 65 can comprise any shape memory alloy. Examples of shape memory alloys include NiTi, NiAl, CuAlNi, CuZnAl, and the like. Shape memory alloy layer 65 can be any thickness, preferably a thin film. Heating element 70 can be any device suitable for heating a localized region of shape memory alloy layer 65. Suitable heating elements 70 include any type of resistive heating elements, such as ohmic heating elements. Cooling element 75 can be any device suitable for cooling a localized region of shape memory alloy layer 65. An example of a suitable cooling element 75 is a Peltier exchanger. A sensor 80 can be connected to heating and cooling elements 70, 75 of damping material 50. Sensor 80 can be any type of sensor suitable for sensing vibrations. Examples of suitable sensors 80 include accelerometers and vibration sensors such as 4-20 mA loop powered sensors suitable for 10 Hz to 4,000 Hz frequency range. Sensor 80 can be secured to damping material 50 or remote to damping material 50. Sensor 80 is not limited to being secured to an end of damping material 50 as illustrated in FIGS. 4 and 5 but instead can be secured to any suitable location on damping material 50. In addition, damping material 50 can have any desirable shape. One skilled in the art would readily understand to select an appropriate shape for a desired application.

It is to be understood that the damping can occur when distributed vibrations generated by the phase transition (e.g., martensite to austenite or vice-versa) spread in body 55. The damping can also occur when unevenly distributed vibrations generated by such phase transitions are spread in parts of body 55. Phase transitions in shape memory allow layer 65 can be sufficient for damping vibrations within the time the onset of the martensitic or austenitic phase transition can be induced. Thermally activated controls can be used to control such transitions. Thermally activated controls determine and control the heating and cooling scheme at which the localized phase changes occur. Such controls include determining the number and spacing of heating and cooling elements 70, 75; determining the amount of heat added by heating elements 70; determining the rate of heat reduction by cooling elements 75; and determining the duration of time at which the heat is added. Therefore, damping material 50 can have any number of heating and cooling elements 70, 75, as determined by the controls. The methods and procedures for determining such activated controls are taught in Kloucek et al., "Thermal Stabilization of Shape Memory Alloy Wires," Smart Structures and Materials 2003: Modeling Signal Processing, and Control, Vol. 5049 (2003) and Kloucek et al, "Computational Modeling of Vibration Damping in SMA Wires," Continuum Mechanics and Thermodynamics 2004, (the "Kloucek" articles) both of which are incorporated by reference herein in their entirety. The Kloucek articles teach that a dynamic model for the temperature control of shape memory alloys can be obtained through computational modeling based on a carefully built Helmholtz free energy, conservation of linear momentum and conservation of energy.

The model provides a characterization of the thermodynamic behavior of shape memory alloy layer 65 for any given type of shape memory alloy. The model is given by the following equations (1)-(4):

$$\rho_0 \partial_{tt}^2 u = \text{Div}(\rho_0 \partial_F \Psi + \alpha \partial_t F) + \rho_0 b \quad (1);$$

$$\rho_0 c_p \partial_t \theta = \text{Tr}((\rho_0 \theta \partial_{F,\theta}^2 \Psi + \partial_t F \alpha) \partial_t F) + \kappa \, \text{Div}(\det(F) (F^T F)^{-1} \nabla \theta) + \rho_0 r \quad (2);$$

$$\Psi(F,\theta) = \chi(\theta) W_M(F) + (1 - \chi(\theta)) W_A(F) + c_p(\theta - \theta \ln \theta) \quad (3);$$

$$\chi(\theta_M) = 1, \quad \chi(\theta_A) = 0, \quad \chi(\theta_C) = \frac{W_A(U_1)}{W_M(I) + W_A(U_1)}. \quad (4)$$

In the equations, $\rho_0$ represents the referential density, $\partial$ represents partial derivative, $\Psi$ represents Helmholtz free energy, u represents deformation of the body with respect to a referential coordinate system, $\theta$ represents absolute temperature, b represents body force, t represents time, $\alpha$ represents viscosity coefficient, F represents deformation gradient, $\kappa$ represents heat conductivity, $W_A$ represents austenite energy isotherm, $W_M$ represents martensite energy isotherm, $c_p$ represents specific heat capacity, r represents heat exchange with the environment, Div represents divergence, T represents transposition, Tr represents trace, $\chi$ represents isotherm profiles interpolation function, I represents the identity matrix, $U_1$ represents a martensite variant, $\theta_M$ represents the martensite finish temperature 25, $\theta_A$ represents the austenite finish temperature 15, and $\theta_C$ represents the critical transformation temperature at which both the austenite and martensite phases may co-exist.

The model given by equations (1)-(4) provides a nonlinear system of partial differential equations. The solution of the model for a type of shape memory alloy provides the thermodynamic behavior of that particular shape memory alloy. It is to be understood that one of ordinary skill in the art can make such a solution of the model. Furthermore, the Kloucek articles teach that through the definition of the martensite and austenite energy isotherms the model, in combination with the solution method using a viscosity-based homotopy applied at the brief moments of the phase transition, can be tailored to evaluate the thermodynamic response of any shape memory alloy. Based upon the model and the type of shape memory alloy used, shape memory alloy layer 65 can be heated using the control represented by equation (5);

$$r(x,t) = A \sin(2pi^*(x/l + t/w)) \text{Watts}, \quad (5),$$

where the amplitude A depends on a particular shape memory alloy to be used and the power of the available heating and cooling elements. This constant A for a particular shape memory alloy can be selected from a range of 0 to 100. The constant l provides a measure of the localization of the heating and cooling controls. The constant w may be varied to allow for a time-dependent nature of the thermal control. In the equation, x represents spatial variable, and t represents time.

The following describes an exemplary embodiment of the present invention as illustrated in FIGS. 3-5. Damping material 50 is attached to body 55. Body 55 can be any type of body. The number and spacing of heating and cooling elements 70, 75 are selected based upon an effective active control of the system of partial differential equations (1)-(4) described above with the Helmholtz free energy tailored to the desired shape memory alloy. It is to be understood that the molecular structure of the crystal lattice can depend on the minimum energy states of the strain energy. In a state of thermal equilibrium, any mechanical equilibrium configuration of the lattice particle can correspond to a minimum of the free energy functional with respect to the deformation gradient. The form of the free energy of the present invention provides a phenomenologically-based, nonlinear model for shape memory wires, as presented in the Kloucek articles. However, through incorporation of the relevant material constants, it is materially tunable, which allows for control over both the nonlinear physics of shape memory alloys as well as the material constants of particular materials.

Figure 7:
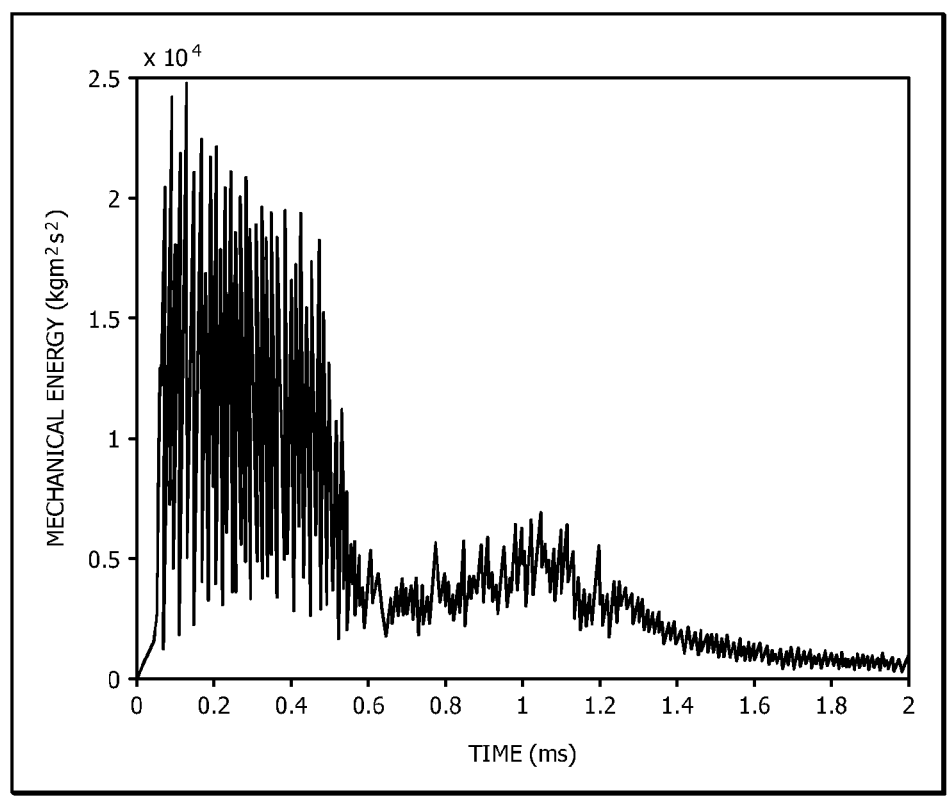
FIG. 7 illustrates a kinetic energy history plot of a shape memory alloy.

Sensor 80 is secured to damping material 50. In alternative embodiments (not illustrated), sensor 80 is not secured to damping material 50 but is instead remote to damping material 50. When sensor 80 detects vibrations in or approaching body 55, it signals to heating elements 70 and cooling elements 75 to apply heat and cooling, respectively, to shape memory alloy layer 65 according to the control equation (5). Such heating and cooling can cause localized areas of shape memory alloy layer 65 to change phases from martensite to austenite and vice-versa. This heating and control allows for both a localization of the temperature change control, as well as a motion of the temperature change in time. Due to the form of this control, there can be a large number of full sine waves periodically heating and cooling the body. Furthermore, due to the factor dividing the time, the control can move along the length of the body, which allows the temperature of the highly-localized regions to reach the transformation temperatures. The control can move at any rate along the length of the body, preferably at a slow rate. It is to be understood that this three-parameter (amplitude, localization and speed) form of the heating and cooling supply comprises an embodiment of the thermal control and is an illustrative example for understanding how localization of the thermal control benefits the vibrational damping. The thermally-induced phase transformation can occur in two stages. The first of these occurs at the onset of the atomic lattice symmetry change. The second stage of the phase transformation can occur after occurrence of the first stage. The second stage may occur due to the latent heat. The resulting phase change can cancel a large portion of the vibrational energy in body 55. The cancellation may occur due to the generation of non-synchronized spurious vibrations caused by the phase change. The kinetic energy can slowly decrease as the temperature increases. FIG. 7 is an illustration of a kinetic energy time history, which shows such a decrease. At the onset of the first stage in the phase transformation, the kinetic energy drops. When this first stage of the phase transformation is complete, there is a spike in the kinetic energy before the second stage of transformation begins. However, when the second stage is complete, the overall kinetic energy in the shape memory alloy layer 65 is significantly smaller than when the simulation began. Without being limited by theory, it is believed that such processes may be conversion between various kinds of energy. For instance, after the initial wave hits the shape memory alloy layer 65, vibrations oscillate rapidly, with significant amounts in both the kinetic and potential energy states. Then, as the temperature is increased, the energetic metastability of the martensite phase increases. The increase in metastability corresponds with a conversion of a significant amount of the kinetic energy to potential energy in the shape memory alloy layer 65. As the phase transition itself occurs, the potential energy reaches its peak, causing a brief calm in the body before the first transformation changes an amount of the shape memory alloy layer 65 into the austenitic state. Such a transformation can increase the kinetic energy dramatically. In addition, such transformation can occur very suddenly. As the second stage of the phase transition is beginning, this kinetic energy is converted into potential energy. When the full phase transformation is complete, the potential energy can be released.

When sensor 80 reads that the vibrational energy in body 55 is reduced below a desired level, sensor 80 communicates to heating elements 70 to stop applying heat and communicates to cooling elements 75 to cool localized areas of shape memory alloy layer 65 to change the phase back to martensite. Such cooling can occur according to the control (5). It is also to be understood that when the phase is changed to martensite that the surface area of damping material 50 can be microscopically increased and that when the phase is changed to austenite that the surface area of damping material 50 can be microscopically decreased. Without being limited by theory, it is believed that such microscopic increase or decrease is caused by shape memory alloy layer 65 forming a non-planar microstructure to achieve an equilibrium state. It is to be understood that damping vibrational energy can result in damping sound as well as vibrations.

In alternative embodiments (not illustrated), more than one sensor 80 is connected to at least one of the heating and cooling elements 70, 75. Based upon the excitement of a heating and/or cooling element, the control given by equation (5) can be initiated.

In other alternative embodiments (not illustrated), a protective coating can be applied to damping material 50. The protective coating can be any material suitable for protecting at least a portion of damping material 50. The protective coating can include silicon, polymers, and the like. The protective coatings can cover any portion or substantially all of damping material 50.

Examples of applications comprising body 55 that have vibrations of which damping material 50 can dampen include satellites, car CD receivers, drills, large bodies (for instance engines), platforms, microscopy, music speakers, and the like. In some embodiments, damping material 50 can be placed at any suitable location on a body 55. In other embodiments, damping material 50 can be placed at locations on a body 55 based on frequency distribution.

Figure 6:
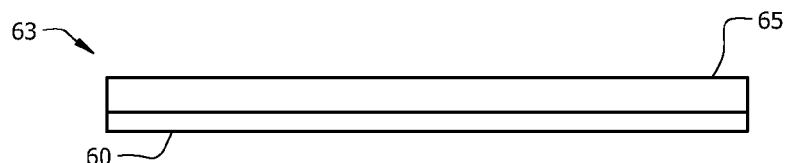
FIG. 6 illustrates a side view of a heat transfer material having a shape memory alloy layer.

FIG. 6 illustrates a heat transfer material 63 that comprises substrate 60 and shape memory alloy layer 65. In such an embodiment, heat transfer material 63 can be attached to a portion or all of the surface of any type of body. When sufficient cooling is added to heat transfer material 63 to change at least a portion of shape memory alloy layer 65 to its alternative martensite phase from its parent austenite phase, at least a portion of shape memory alloy layer 65 can rise microscopically. The surface area of heat transfer material 63 and the material body can thereby be increased. The surface area can also be increased by changing the phase from one martensite variant to another by changing the temperature. Such an increase in surface area can increase the heat transfer from the material body. For instance, heat transfer material 63 can be attached to an appropriate area of a heat exchanger such as the cool side of the exchanger or any other suitable area. For example, heat transfer material 63 can be attached to cooling tubes of a shell-and-tube heat exchanger. When a cooling fluid is added to the heat exchanger, at least a portion of shape memory alloy layer 65 can change to its martensite phase by the reduction in temperature to below the martensite start temperature 20 of the shape memory alloy layer 65, which thereby increases the surface area of the exchanger. Such increase in surface area can facilitate the heat transfer from the fluid. It is to be understood that one skilled in the art can select a suitable shape memory alloy having a martensite phase change start and finish temperature 20, 25 that are within the temperature of the fluid.

It is to be understood that the present invention is not limited to a shape memory alloy layer but can include other embodiments of shape memory alloy configurations such as segments of shape memory alloys.

EXAMPLE

A wire made of NiTi alloy with the parameters given by Table 1 and having a small cross-sectional area, $2 \times 10^{-8}$ m$^2$, was unevenly heated using the following control:

$$r(x,t)=64.5 \sin(2pi*(x/10+t/2)) \text{Watts}.$$

The duration of the experiment was 2 ms. At the end, most of the vibrational energy was eliminated. These results were analyzed in relation to the locality of the phase transformations. The sudden phase transformation resulted in an abrupt burst of kinetic energy that then resonated at the characteristic speed of the austenitic phase in the wire. The localized phase transformations of this example induced bursts of vibrational energy. It is believed that the distributed nature of the phase transformation regions left regularly-spaced regions in which these vibrations travel. Since the induced vibrations travel at the same speeds through these untransformed regions, the self-cancellation of such anti-phase vibrations resulted in the overall damping observed in this experiment. About 80% of the vibrational energy was eliminated at the onset of the phase transition at about 0.6 ms.

TABLE 1

NiTi material constants used within the calculations

| Constant | Value | Units | Description |
|---|---|---|---|
| $\rho_0$ | $6.45 \times 10^3$ | kg m$^{-3}$ | density |
| $\kappa$ | 10 | W m$^{-1}$ K$^{-1}$ | thermal conductivity |
| $c_p$ | 322 | J kg$^{-1}$ K$^{-1}$ | specific heat capacity |
| $E_a$ | $7.5 \times 10^{10}$ | Pa | austenite elastic modulus |
| $E_m$ | $2.8 \times 10^{10}$ | Pa | martensite elastic modulus |
| L | 0.05 | m | length of wire |
| $\beta$ | $2 \times 10^{-8}$ | m$^2$ | cross-sectional area of wire |
| $\theta_A$ | 350 | K | austenite finish temperature |
| $\theta_C$ | 335 | K | critical transition temperature |
| $\theta_M$ | 320 | K | martensite finish temperature |

Figure 8:
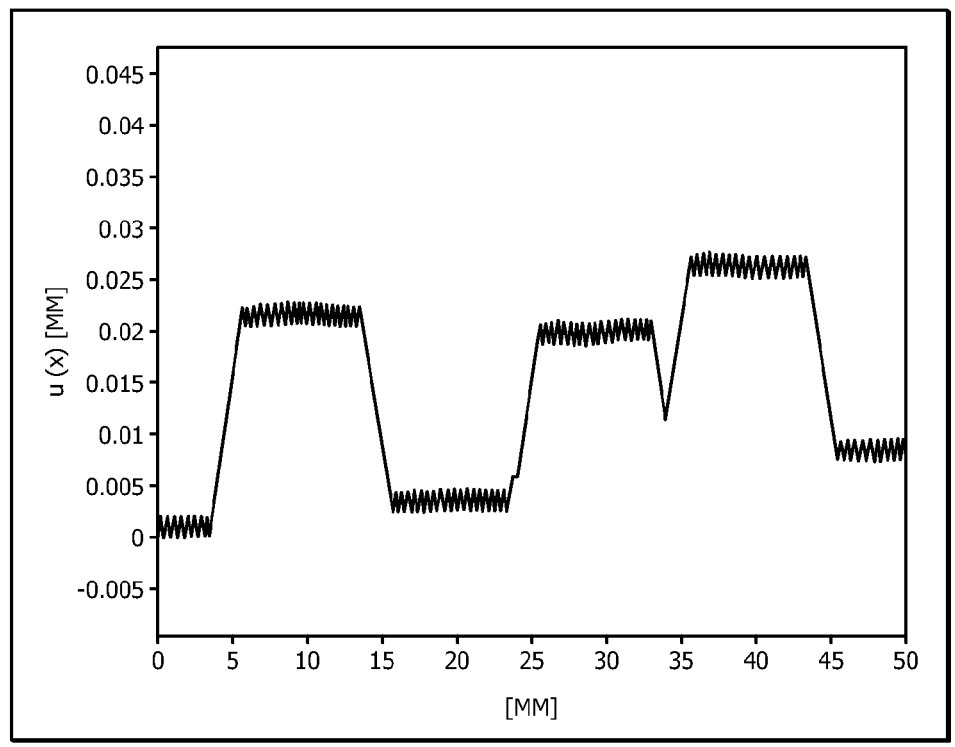
FIG. 8 illustrates a displacement plot of a shape memory alloy.
Figure 9:
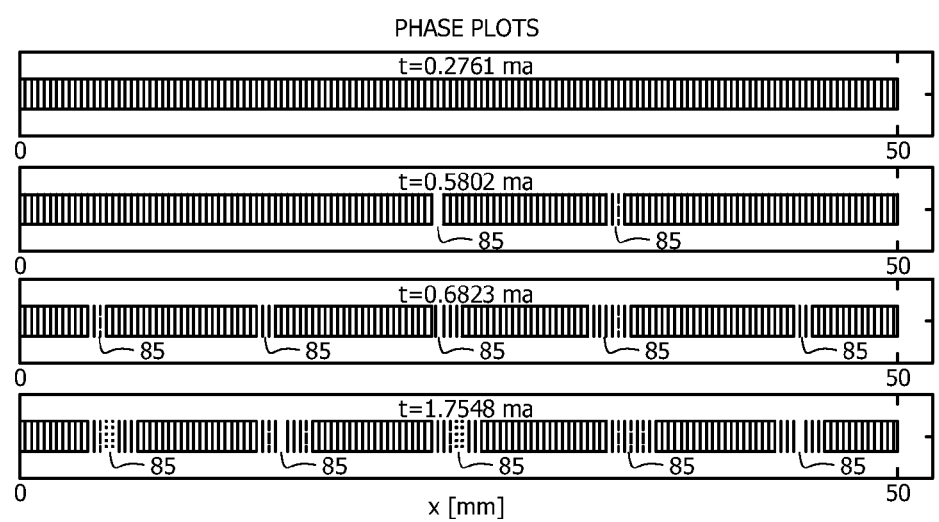
FIG. 9 illustrates a distribution of variants for a shape memory alloy wire.

The results are illustrated in FIGS. 7 and 8. FIG. 7 illustrates the kinetic energy history, and FIG. 8 illustrates a snapshot of displacement in the midst of the overall martensitic phase transformation at t=0.9644 ms. FIG. 9 shows the distribution of martensitic variants for the wire during the experiment. The light region 85 shows placements of the heating units along the length of the wire.

It was observed at time t=0.5 ms that the phase transformation began in the wire at the many local peaks of the thermal control. It was further observed that the transformation occurs suddenly in locally isolated areas of the wire, which again resulted in a small kinetic energy increase. As illustrated by the results in FIG. 7, the resulting vibrations cancelled each other out.

Although the present invention and its advantages have been described in detail, it should be understood that various changes, substitutions and alterations may be made herein without departing from the spirit and scope of the invention as defined by the appended claims.

What is claimed is:

1. A method for damping vibrational energy in a body, comprising;

(A) attaching a damping device to the body, said damping device comprises a substrate, a shape memory alloy layer disposed on at least a portion of the surface of said substrate, and a plurality of temperature change elements disposed on the shape memory alloy layer, wherein said damping device is in continuous and direct contact with the surface of the body;

(B) sensing vibrations in the body; and (C) in response to the sensed vibrations, using a sinusoidal model based upon amplitude, localization, and speed to control each temperature change element so as to provide a temperature change in localized regions of the shape memory alloy layer and dampen the vibrational energy in the body.

2. The method of claim 1, wherein the body is a drill, a platform, a large body, or a music speaker.

3. The method of claim 1, wherein the substrate comprises polymers or fibers from carbon nanotubes.

4. The method of claim 1, wherein the shape memory alloy comprises NiTi, NiAl, CuZnAl or CuAlNi.

5. The method of claim 1, wherein the temperature change elements are sufficiently spaced to provide localized phase changes in the shape memory alloy layer.

6. The method of claim 1, wherein the plurality of temperature change elements comprise at least one heating element and further comprising indicating to the at least one heating element to supply heat to the shape memory alloy layer, wherein the heat is sufficient to provide a phase change in at least a portion of the shape memory alloy layer to an austenite phase.

7. The method of claim 1, wherein the plurality of temperature change elements comprise at least one cooling element and further comprising indicating to the at least one cooling element to cool the shape memory alloy layer, wherein the cooling is sufficient to provide a phase change in at least a portion of the shape memory alloy layer to a martensite phase.

8. The method of claim 1, wherein step (B) is accomplished by a sensor.

9. The method of claim 8, wherein the sensor is attached to the damping device.

10. The method of claim 1, wherein step (C) is accomplished when the vibrations are from about 10 Hz to about 4,000 Hz.

11. The method of claim 1, wherein the damping device further comprises a coating that covers at least a portion of the shape memory alloy layer.

12. The method of claim 11, wherein the coating comprises silicon or a polymer.

13. The method of claim 1, wherein the shape memory alloy layer is a thin film.

14. The method of claim 1, wherein step (C) is accomplished by a control.

15. The method of claim 1 wherein the sinusoidal model comprises the following equation:

$$r(x,t)=A\sin(2pi*(x/10+t/2))\text{Watts}$$

wherein A represents amplitude and is a number ranging from 1 to about 100, t is time in milliseconds, and x is a number ranging from 0 to L, wherein L is the length of the shape memory alloy layer.

* * * * *